Aug. 7, 1962    R. WEPPLER    3,048,765
FREQUENCY MULTIPLIER SYSTEM
Filed Aug. 13, 1958
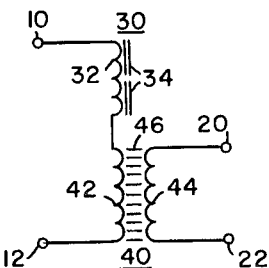
Fig. 1
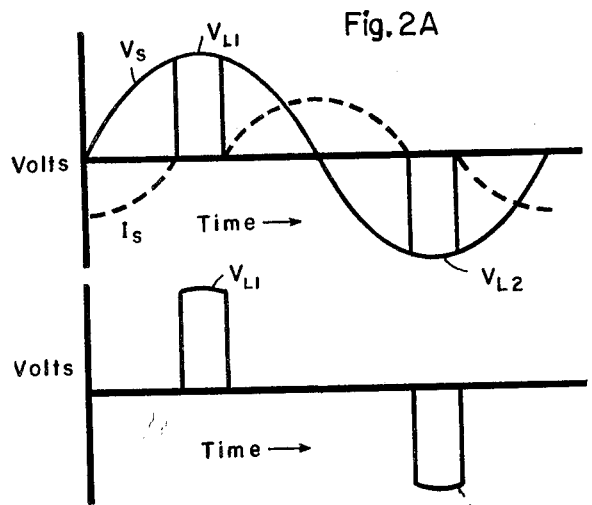
Fig. 2A
Fig. 2B
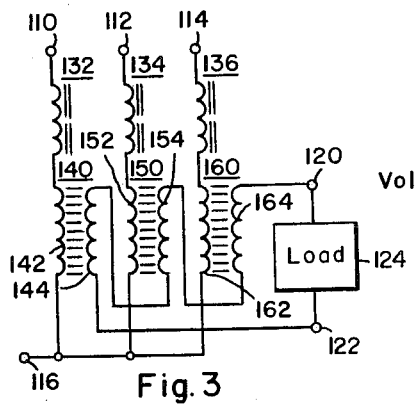
Fig. 3
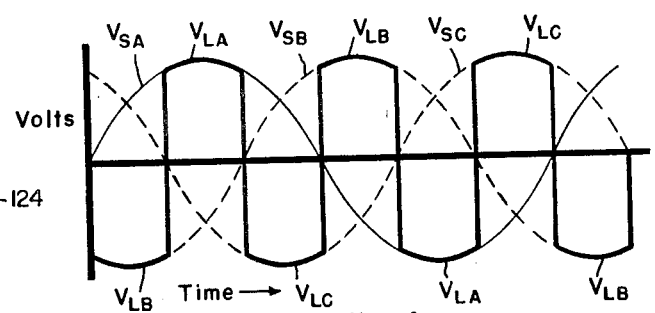
Fig. 4
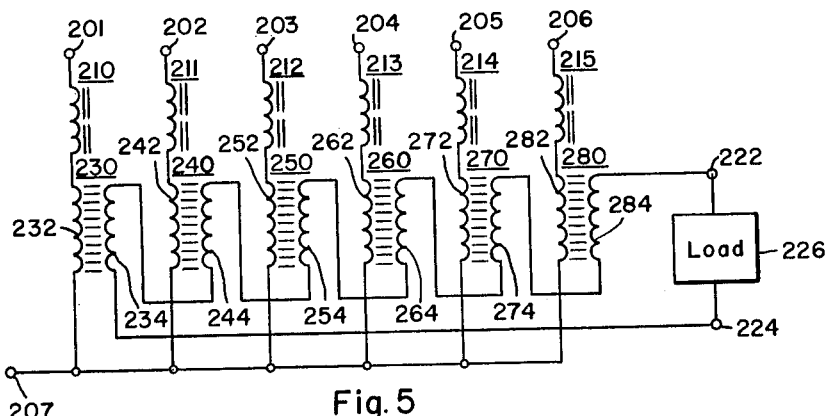
Fig. 5
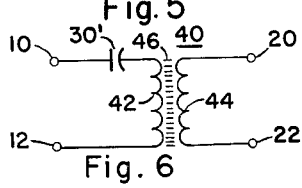
Fig. 6
WITNESSES
John E. Hensley, Jr.
James F. Young
INVENTOR
Rudolf Weppler
BY
F. E. Browder
ATTORNEY United States Patent Office 3,048,765
Patented Aug. 7, 1962

3,048,765
FREQUENCY MULTIPLIER SYSTEM
Rudolf Weppler, Nurnberg, Germany, assignor to Siemens-Schuckertwerke Aktiengesellschaft, Erlangen, Germany, a corporation of Germany
Filed Aug. 13, 1958, Ser. No. 754,842
Claims priority, application Germany Aug. 23, 1957
11 Claims. (Cl. 321—7)

This invention relates to frequency changer systems, and more particularly to frequency multiplier systems of the static type.

There are several conventional frequency multiplier system including saturable transformers or reactors connected to a three-phase electrical power supply or to an electrical power supply having any number of phases. For example, in one well-known system, the secondary windings of saturable transformers are connected in series with a load circuit to provide a single-phase voltage output having a frequency which is an odd-numbered multiple of the frequency of the electrical power supply to which the primary windings of the transformers are connected. Frequency transformation or multiplication in the latter system is based on the fact that higher harmonics of a flux may be obtained by magnetizing saturable transformers beyond saturation. The first harmonics or fundamental frequencies of the fluxes and the voltages induced in the secondary windings of the saturable transformers are arranged to cancel each other while the voltages induced by the higher harmonics of the flux provide a resultant voltage to a load circuit having a higher frequency than the frequency of the electrical power supply. If it is desired to provide a single-phase output voltage having a frequency which is three times or five times that of an electrical power supply, then a three-phase or five-phase power supply must be provided and the third or fifth harmonic of the induced flux in the saturable transformers included in a conventional frequency multiplier system is utilized.

A second conventional frequency multiplier system does not require an electrical power supply having a large number of phases. Instead this system may be employed with a three-phase electrical power supply and saturable transformers included in such a system are also employed as phase changers or shifters. In this case the saturable transformers provide the required phase angle displacements of the first harmonics or fundamental frequencies of the three-phase electrical power supply. The required phase angle displacements of the fundamental frequency may be expressed as α which is equal to $$\frac{2\pi}{n}$$

for the $n$-fold frequency or the frequency which is "$n$" times as great as the fundamental frequency of the three-phase electrical supply. In a frequency multiplier system of the second type, the resultant or the total secondary voltage is also obtained by saturation of the magnetic steel included in a saturable transformer and the utilization of the harmonics of the flux induced in the saturable transformers.

The conventional frequency multiplier systems described above have several disadvantages which heretofore have made their practical application undesirable. First, the output power of a conventional frequency multiplier system as described is only a small fraction, for example 4 to 5%, of the nominal power rating of the saturable transformers included in each system. As used hereinafter the nominal power rating indicates the power rating that the magnetic core of the saturable transformer can handle. Second, the use of high-quality magnetic material having a substantially rectangular core loop is not possible or practical since the curvature of the magnetization curve or core loop is of importance in the operation of a conventional frequency multiplier system as described. Therefore, low quality magnetic sheet steel must be used in a frequency multiplier system of the type described. The latter factor and the mode of operation of a conventional frequency multiplier system, as described prohibits any appreciable increase in the voltage of the electrical power supply since such an increase might result in the destruction of the apparatus included in such a frequency multiplier system. Further there are other factors which must be carefully considered in the operation of a conventional frequency multiplier system as described, such as the magnetic characteristics of the core included as part of each saturable transformer, and the required tolerances in the production of such apparatus.

It is an object of this invention to provide a new and improved frequency multiplier system.

Another object of this invention is to provide a frequency multiplier system of the static type having a higher efficiency.

A more specific object of this invention is to provide an improved static frequency multiplier system including saturable transformers and linear reactances.

A further object of this invention is to provide an alternating current output having a substantially rectangular wave form from a source of alternating current.

Other objects of the invention will in part be obvious and will in part appear hereinafter.

For a fuller understanding of the nature and objects of the invention, reference should be had to the following detailed description taken in connection with the accompanying drawing, in which:

FIG. 1 is a schematic diagram illustrating the principle of operation of the invention;

FIGS. 2A and 2B graphically illustrate some of the voltages and currents associated with the schematic diagram shown in FIG. 1;

FIG. 3 is a schematic diagram illustrating a frequency multiplier system embodying the teachings of this invention;

FIG. 4 is a graph illustrating some of the voltages associated with the schematic diagram shown in FIG. 3;

FIG. 5 is a schematic diagram of a second frequency multiplier system embodying the teachings of the invention; and FIG. 6 is a schematic diagram similar to FIG. 1 showing the use of a different type of linear reactance.

Referring now to the drawing and FIG. 1 in particular, there is shown a schematic diagram which illustrates generally the principle of operation of a frequency multiplier system embodying the teachings of the invention. A source of alternating current (not shown) would be connected to the input terminals 10 and 12. The voltage associated with the source of alternating current or electrical power system connected at the input terminals 10 and 12 is indicated as $V_s$. In general, a saturable transformer 40 and a reactance which is substantially linear, specifically the reactor or inductance 30, are connected in series circuit relationship across the input terminals 10 and 12.

In particular, the substantially linear reactor 30 includes a winding 32 disposed on a magnetic core 34 having an air-gap. The saturable transformer 40 includes a primary winding 42, a secondary winding 44, and a saturable magnetic core 46 on which said windings are disposed. The winding 32 of the reactor 30 is connected in series with the primary winding 42 of the saturable transformer 40, the series circuit being connected between the input terminals 10 and 12. The secondary winding 44 of the saturable transformer 40 is connected to the output terminals 20 and 22 to provide output voltage impulses as indicated by $V_L$. The saturable core 46 of the saturable transformer 40 is preferably formed from a magnetic material having a substantially rectangular core loop. For reasons which will be explained hereinafter, the power rating of the reactor 30 should be approximately equal to the power rating of the saturable transformer 40.

The operation of the circuit shown in FIG. 1 can be best understood by referring to the voltage and current wave forms illustrated in FIGS. 2A and 2B. The voltage associated with the source of alternating current (not shown) connected at the input terminals 10 and 12 is indicated by the curve $V_s$ and plotted as a function of time. The current from the source of alternating current connected at the terminals 10 and 12 is indicated by the curve $I_s$ which is also plotted as a function of time. The output voltage impulses which appear at the output terminals 20 and 22, are indicated as $V_{L1}$ and $V_{L2}$ during successive half cycles of the supply voltage $V_s$ as shown in FIG. 2A and separately in FIG. 2B.

In the absence of the saturable transformer 40 the current flowing through the reactor 30 would lag the voltage across the reactor 30 by substantially 90°. The latter condition also prevails when the core 46 of the saturable transformer 40 is magnetized beyond its saturation value and the voltage drop across the primary winding 42 is substantially negligible. When, however, the current $I_s$ in the series circuit, which includes the reactor 30 and the primary winding 42 of the transformer 40, decreases to a low value or, as shown in FIG. 2A, approaches a zero value and begins to flow in the reverse direction, the core 46 of the transformer 40 is temporarily in an unsaturated condition and a voltage impulse appears at the output terminals 20 and 22 across the secondary winding 44. In other words, while the core 46 of the transformer 40 is saturated, substantially all of the supply voltage $V_s$ will be impressed across the reactor 30. When the core 46 is unsaturated, substantially all of the supply voltage $V_s$ is impressed across the primary winding 42 of the transformer 40 and a voltage impulse appears or is transmitted to the secondary winding 44 at the output terminals 20 and 22, as indicated by the voltage impulses $V_{L1}$ and $V_{L2}$ during successive half cycles of the supply voltage $V_s$ as shown in FIGS. 2A and 2B.

The average value or the voltage-time area of the voltage impulses which appears across the secondary winding 44 of the transformer 40 will have a magnitude which is equal to $2 \cdot N \cdot B_s \cdot A$, in which N is the number of turns, $B_s$ is the saturation flux density, and A is the cross-sectional area of the magnetic steel included in the core 46. Considering the latter relationship, it is to be noted that the value of the supply voltage $V_s$ has substantially no influence on the output voltage impulses transmitted to the secondary winding 44 of the saturable transformer 40. Therefore, the voltage-time area of the voltage impulse at the output terminals 20 and 22 is substantially independent of variations in the supply voltage $V_s$. It is to be noted that the output terminals 20 and 22 would be connected to a load circuit (not shown) connected at the output terminals 20 and 22.

In summary, the circuit shown in FIG. 1 operates to produce an output voltage impulse of alternating polarity at the terminals 20 and 22 for each half-cycle of the alternating current from the source connected at the input terminals 10 and 12. The circuit shown in FIG. 1 illustrates a single phase of an over-all frequency multiplier system as will be explained hereinafter.

Referring now to FIG. 3 there is illustrated a frequency multiplier system for supplying from a source of alternating current to a load circuit, an alternating current output having a frequency which in this case is three times the frequency of the alternating current from a polyphase source (not shown) connected at the input or line terminals 110, 112 and 114. In general, the frequency multiplier system, shown in FIG. 3, includes a plurality of saturable transformers each having a primary winding and a secondary winding, and a plurality of substantially linear reactors with each of said reactors being connected in series between the primary winding of an associated saturable transformer and one of the input terminals of a polyphase source of alternating current. The secondary windings of the saturable transformers are connected in series circuit relationship with a load circuit including a load 124 to provide an alternating current output having a frequency which is greater than that of the source of alternating current connected at the input terminals.

In particular, the saturable transformers 140, 150 and 160 include the primary windings 142, 152 and 162 respectively, and the secondary windings 144, 154, and 164, respectively. A substantially linear reactor 132 is connected in series with the primary winding 142 of the saturable transformer 140, the series circuit being connected between the input terminal 110 and a common or neutral terminal 116. Similarly the substantially linear reactors 134 and 136 are connected in series with the primary windings 152 and 162 of the associated saturable transformers 150 and 160, respectively, the series circuits being connected between the input terminals 112 and 114, respectively, and the common or neutral terminal 116. The secondary windings 144, 154 and 164 of the transformers 140, 150 and 160 respectively, are connected in series circuit relation with one another, the series circuit being connected to the output terminals 120 and 122 across the load 124 to provide an alternating current output having a frequency which is three times the frequency of the alternating current from the three-phase source connected at the input terminals 110, 112 and 114. The connection of the primary windings 142, 152, and 162 of the transformers 140, 150 and 160 respectively, may be described also as a Y connection.

In general, each phase of the frequency multiplier system, shown in FIG. 3, operates similarly to the circuit shown in FIG. 1 whose operation has already been explained. The over-all operation of the frequency multiplier system shown in FIG. 3, is to provide an alternating current output from a three-phase or polyphase source of alternating current to a load circuit, the frequency of the alternating current output being three times as great as the frequency of the three-phase alternating current at the input terminals and being single phase rather than three-phase.

Referring to FIG. 4 the operation of the frequency multiplier system shown in FIG. 3 is illustrated. The curves $V_{SA}$, $V_{SB}$ and $V_{SC}$ represent the voltages associated with each phase of the alternating current from the source connected at the input terminals 110, 112 and 114 plotted as a function of time. As illustrated, the three-phase voltages $V_{SA}$, $V_{SB}$, and $V_{SC}$ differ in phase by substantially 120 electrical degrees. The output voltage impulses which appear across the secondary windings 144, 154 and 164 of the saturable transformers 140, 150 and 160 respectively, are represented by the curves $V_{LA}$, $V_{LB}$ and $V_{LC}$, respectively. As illustrated in FIG. 4, the output voltage impulses $V_{LA}$, $V_{LB}$ and $V_{LC}$ are combined by the connection of the secondary windings 144, 154 and 164 of the transformers 140, 150 and 160, respectively, to provide an alternating current output having a substantially rectangular wave form and having a frequency which is three times that of the alternating current from the three-phase source connected at the input terminals 110, 112 and 114. For example, if the frequency of the alternating current from the three-phase source at the terminals 110, 112 and 114 were 50 cycles per second, the frequency of the alternating current output supplied to the load 124 at the terminals 120 and 122 will be 150 cycles per second. In other words, while the primary windings 142, 152 and 162 are arranged in a Y connection to be connected to a three-phase source at the terminals 110, 112 and 114, the secondary windings 144, 154 and 164 are connected so that the output voltage impulses across each of said secondary windings are combined to provide an alternating current output to the load 124 having a higher frequency than that of the alternating current from the three-phase source.

Referring to FIGS. 3 and 4, it is to be understood that the circuit shown in FIG. 3 may be provided to obtain a substantially rectangular alternating current output from the three-phase source connected at the input terminals 110, 112, and 114 by reversing the connections of one of the secondary windings of the saturating transformers 140, 150 and 160. For example, if the connection of the secondary winding 144 of the transformer 140 were reversed the output voltage impulse $V_{LA}$ would be reversed in polarity for a particular half cycle of the supply phase voltage $V_{SA}$ or substantially 180° in phase, so that a substantially rectangular single-phase output voltage would be provided across the load 124 at the terminals 120 and 122. The frequency of the latter output voltage would be the same as the frequency of the alternating current from the source connected at the input terminals 110, 112 and 114. In the latter arrangement the substantially rectangular alternating current output would include slightly undulating peaks.

Referring now to FIG. 5 there is illustrated a second frequency multiplier system embodying the teachings of this invention. In general, the frequency multiplier system, shown in FIG. 5 provides an alternating current output to a load circuit having a frequency which is six times that of the alternating current from the source connected at the input terminals 201, 202, 203, 204, 205, and 206. The frequency multiplier system, shown in FIG. 5 is similar to the frequency multiplier system shown in FIG. 3, except that a six-phase alternating current input would be required and the frequency of the alternating current input would be twice as great as the output of the system shown in FIG. 3.

In particular, the frequency multiplier system shown in FIG. 5 includes a plurality of saturable transformers 230, 240, 250, 260, 270 and 280 and a plurality of substantially linear reactors 210, 211, 212, 213, 214 and 215. The saturable transformers 230, 240, 250, 260, 270 and 280 include the primary windings 232, 242, 252, 262, 272, and 282 and the secondary windings 234, 244, 254, 264, 274 and 284, respectively. Each one of the reactors 210 through 215 is connected in series circuit relation with one of the primary windings, 232, 242, 252, 262, 272 and 282 respectively, of the associated saturable transformers 230 to 280 respectively, each of the series circuits being connected between one of the input terminals 201 to 206, respectively, and the common or neutral terminal 207. The secondary windings 234, 244, 254, 264, 274, and 284 of the saturable transformers 230 to 280 respectively, are connected in series circuit relationship, the series circuit being connected to the output terminals 222 and 224 across the load 226.

In operation the frequency multiplier system shown in FIG. 5 operates similarly to the frequency multiplier system shown in FIG. 3 except that a six-phase alternating current source (not shown) is connected at the input terminals 201 to 206. The phase voltages associated with the terminals 202, 204 and 206 are substantially 180° out of phase with the phase voltages at the terminals 201, 203 and 205. Each of the secondary windings of the transformers 230 to 280 provide output impulse voltages which are combined by the series circuit connection to form an alternating current output at the terminals 222 to 224 having a frequency which is six times the frequency of the alternating current from the source connected at the input terminals 201 to 206. The alternating current output supplied to the load 226 at the terminals 222 and 224 would of course be a single phase alternating phase output rather than a polyphase output.

It is to be understood that capacitors may be substituted for the substantially linear reactors shown in FIGS. 1, 3 and 5 in providing a frequency multiplier system embodying the teachings of this invention. Referring to FIG. 6, there is shown a schematic diagram of a circuit similar to that shown in FIG. 1 in which a capacitor 30' is substituted for the reactor 30 shown in FIG. 1. It is obvious that the embodiments of FIGS. 3 and 5 could be modified similarly. If capacitors are employed, however, in a frequency multiplier system as disclosed, self-oscillation may result during operation of such a system when the system is operating at or near a no-load condition. When the system is operating with a substantial load, however, such oscillations are suppressed through the effective damping, in which case the comparatively large reactors may be replaced by capacitors without any risk.

The apparatus and circuits embodying the teachings of this invention have several advantages. For example, a frequency multiplier as disclosed allows a great utilization of the inherent or built-in power rating of the apparatus included in the system. It has been found if a frequency multiplier system as disclosed is connected to a three-phase electrical power supply, the secondary power output is three times as great as that of a conventional frequency multiplier system as previously described. In such a comparison, it is assumed that the power rating of the saturable transformers and the series-connected reactors is equal to the power rating of the saturable transformers alone included in a conventional frequency multiplier system as described. The utilization of the power rating of the apparatus included in a system as disclosed can be further improved by including in the saturable transformers a core made from a magnetic material having a substantially rectangular core loop. The latter material can be employed in a saturable transformer in a system as disclosed since a different mode of operation is involved compared to a conventional frequency multiplier system as described. It has been found that a frequency multiplier system as disclosed requires a total power rating of the apparatus included in the system which is only five times as much as the secondary power output required.

A second advantage of a frequency multiplier system as disclosed is that the secondary or output voltage is largely independent of the load current as well as being independent of variations in the supply input line voltage over a rather wide range of load currents. This is because the mode of operation of the disclosed frequency multiplier system is based on the principle of transforming output voltage impulses, whose magnitude is dependent only upon the dimensions of the saturable transformers and the properties of the magnetic material from which the cores of the transformers are made as well as upon the input frequency of the alternating current. It has been found that tolerances in production have but slight effect on the operation of a frequency multiplier system as disclosed.

Because of its simple construction and larger power capacity, a frequency multiplier system as disclosed is particularly suitable as an input source for magnetic amplifiers since it is well-known that the time-constant of a magnetic amplifier is reduced with an increase in the frequency of the supply voltage. Other applications of a frequency multiplier system as disclosed include the supply of small synchronous and asynchronous motors, particularly those for use with machine tools, gyrocompasses and the like.

Since numerous changes may be made in the above described apparatus and circuits, and different embodiments of the invention may be made without departing from the spirit thereof, it is intended that all the matter contained in the foregoing description or shown in the accompanying drawings shall be interpreted as illustrative and not in a limiting sense.

I claim as my invention:

1. In a frequency multiplier system for providing an increased frequency from a polyphase source of alternating current to a load circuit, the combination comprising, a plurality of saturable transformers each having a primary winding, a secondary winding and a magnetic core formed from a magnetic material having a substantially rectangular core loop, and a plurality of substantially linear reactances, each of said reactances being connected between one phase of said source and a primary winding of one of said saturable transformers, the secondary windings of said transformers being connected in series with said load circuit to provide an alternating current output having a substantially rectangular waveform and having an increased frequency to said load circuit.

2. In a frequency multiplier system, the combination comprising a polyphase source of alternating current, a plurality of saturable transformers each having a primary winding, a secondary winding and a magnetic core formed from a magnetic material having a substantially rectangular core loop, and a plurality of reactances, each reactance being substantially linear, one of said reactances being connected between each phase of said source and a primary winding of one of said saturable transformers, the secondary windings of said transformers being connected in series to provide an alternating current output having a frequency greater than that of said source, and a load circuit connected to the output of said secondary windings.

3. In a frequency multiplier system, the combination comprising a polyphase source of alternating current, a plurality of saturable transformers each having a primary winding, a secondary winding and a magnetic core formed from a magnetic material having a substantially rectangular core loop, and a plurality of reactances each having a substantially linear reactance and comprising an inductance including a magnetic core having an air-gap, one of said reactances being connected between each phase of said source and a primary winding of one of said saturable transformers, the secondary windings of said transformers being connected in series to provide an alternating current output having a frequency greater than that of said source, and a load circuit connected to the output of said secondary windings.

4. In a frequency multiplier system for providing an output having a higher frequency to a load circuit from a polyphase source of alternating current, the combination comprising, a plurality of saturable transformers each having a primary winding, a secondary winding and a magnetic core structure formed from material having a substantially rectangular core loop, and a substantially linear reactance associated with each primary winding and connected between one phase of said source and the associated primary winding, the secondary windings of said saturable transformers being connected in series with said load circuit to provide an alternating current output having a substantially rectangular waveform and a frequency higher than that of said source.

5. In a frequency tripler system, the combination comprising, a three-phase source of alternating current, three saturable transformers each having a primary winding, a secondary winding and a magnetic core formed from a magnetic material having a substantially rectangular core loop, and a substantially linear reactance associated with each primary winding and connected between one phase of said source and the associated primary winding, the primary windings of said transformers being connected in Y and the secondary windings being connected in series with a load circuit to provide an alternating current output having a frequency substantially three times that of said source.

6. In combination, a polyphase source of alternating current, a plurality of saturable transformers each having a primary winding, a secondary winding and a magnetic core formed from a magnetic material having a substantially rectangular core loop, and a substantially linear reactance associated with each primary winding and connected between one phase of said source and the associated primary winding, the secondary windings of said transformers being connected in series with at least one of said windings being reverse connected to provide an alternating current output of the same frequency as said source and having a substantially rectangular waveform.

7. In a frequency multiplier system, the combination comprising a polyphase source of alternating current, a plurality of saturable transformers each having a primary winding, a secondary winding and a magnetic core formed from a magnetic material haveing a substantially rectangular core loop, and a plurality of substantially linear reactances, each reactance being associated with a primary winding of a saturable transformer and including a magnetic core, the power rating of each saturable transformer being approximately the same as that of the associated reactance, the primary windings of said saturable transformers each being connected in circuit relation with one phase of said source through one of said linear reactances, the secondary windings of said saturable transformers being connected in series circuit relation to provide an alternating current output having a frequency higher than that of said source.

8. In a frequency multiplier system for providing an increased frequency from a polyphase source of alternating current to a load circuit, the combination comprising, a plurality of saturable transformers each having a primary winding, a second winding and a magnetic core formed from a magnetic material having a substantially rectangular core loop, and a plurality of substantially linear reactances, each of said linear reactances comprising a capacitor, each of said reactances being connected between one phase of said source and a primary winding of one of said saturable transformers, the secondary windings of said transformers being connected in series with said load circuit to provide an increased frequency to said load circuit.

9. In a frequency multiplier system for providing an output having a higher frequency to a load circuit from a polyphase source of alternating current, the combination comprising, a plurality of saturable transformers each having a primary winding, a secondary winding and a magnetic core formed from material having a substantially rectangular core loop, and a substantially linear reactance comprising a capacitor associated with each primary winding and connected between one phase of said source and the associated primary winding, the secondary windings of said saturable transformers being connected in series with said load circuit to provide an alternating current output having a frequency higher than that of said source.

10. In combination, a polyphase source of alternating current, a plurality of saturable transformers each having a primary winding, a secondary winding and a magnetic core formed from a magnetic material having a substantially rectangular core loop, and a substantially linear reactance comprising a capacitor associated with each primary winding and connected between one phase of said source and the associated primary winding, the secondary windings of said transformers being connected in series with at least one of said windings being reverse connected to provide an alternating current output of the same frequency as said source and having a substantially rectangular waveform.

11. In a frequency multiplier system, the combination comprising a polyphase source of alternating current, a plurality of saturable transformers each having a primary winding, a secondary winding, and a magnetic core formed from a magnetic material having a substantially rectangular core loop, a plurality of substantially linear reactances each comprising a capacitor, one of said reactances being connected between each phase of said source and a primary winding of one of said saturable transformers, the secondary windings of said transformers being connected in series to provide an alternating current output having a substantially rectangular waveform and a frequency greater than that of said source, and a load circuit connected to the output of said secondary windings.

References Cited in the file of this patent

UNITED STATES PATENTS

| | | |
|---|---|---|
| 1,180,800 | Taylor | Apr. 25, 1916 |
| 2,727,159 | Sunderlin | Dec. 13, 1955 |
| 2,820,942 | Depenbrock | Jan. 21, 1958 |